(12) United States Patent
Hashimoto et al.

(10) Patent No.: US 8,701,344 B2
(45) Date of Patent: Apr. 22, 2014

(54) PLANT CULTIVATING SUBSTRATE AND METHOD OF ITS MANUFACTURE

(75) Inventors: Masaki Hashimoto, Ibaraki (JP); Katsuro Miyagawa, Takatsuki (JP); Katsu Takatsuto, Kawagoe (JP)

(73) Assignee: Suntory Holdings Limitied, Osaka (JP)

( * ) Notice: Subject to any disclaimer, the term of this patent is extended or adjusted under 35 U.S.C. 154(b) by 1848 days.

(21) Appl. No.: 10/561,622

(22) PCT Filed: Jun. 18, 2004

(86) PCT No.: PCT/JP2004/008606
§ 371 (c)(1),
(2), (4) Date: Jun. 1, 2006

(87) PCT Pub. No.: WO2004/112461
PCT Pub. Date: Dec. 29, 2004

(65) Prior Publication Data
US 2006/0248796 A1  Nov. 9, 2006

(30) Foreign Application Priority Data
Jun. 20, 2003  (JP) ................................. 2003-176107

(51) Int. Cl.
*A01G 31/00*  (2006.01)
(52) U.S. Cl.
USPC .......................................................... 47/59 S
(58) Field of Classification Search
USPC .............................. 119/59 S, 58.1 R, 58.1 SC
See application file for complete search history.

(56) References Cited

U.S. PATENT DOCUMENTS

| | | | |
|---|---|---|---|
| 2,988,441 A | | 6/1961 | Pruitt |
| 3,805,532 A | * | 4/1974 | Kistner ........................ 405/264 |
| 3,812,619 A | * | 5/1974 | Wood et al. ................ 47/58.1 R |
| 3,889,417 A | * | 6/1975 | Wood et al. ................ 47/58.1 R |
| 4,074,997 A | * | 2/1978 | Cohen .............................. 71/24 |
| 4,443,969 A | | 4/1984 | Hanacek et al. |
| 4,495,310 A | * | 1/1985 | Dedolph ........................ 521/99 |
| RE32,476 E | * | 8/1987 | Kistner ........................ 405/264 |
| 6,479,433 B1 | | 11/2002 | Hann et al. |
| 2004/0045217 A1 | * | 3/2004 | Chiddick et al. ............. 47/59 S |
| 2005/0076564 A1 | * | 4/2005 | Castleberry .................. 47/59 S |

FOREIGN PATENT DOCUMENTS

| | | |
|---|---|---|
| JP | 56-18165 B2 | 4/1981 |
| JP | 1-309623 A | 12/1989 |
| JP | 1-309624 A | 12/1989 |
| JP | 2-20221 A | 1/1990 |
| JP | 5-35643 B2 | 5/1993 |

OTHER PUBLICATIONS

Canadian Office Action issued with respect to counterpart Canadian Application No. 2,530,007 dated Jun. 4, 2012.
Supplemental European Search Report issued with respect to counterpart EP 04746108.2, dated Jul. 29, 2013.
Examination Report issued with respect to counterpart EP 04746108.2, dated Oct. 15, 2013.

\* cited by examiner

*Primary Examiner* — Son T Nguyen
(74) *Attorney, Agent, or Firm* — Greenblum & Bernstein, P.L.C.

(57) ABSTRACT

To provide a plant cultivating substrate which satisfies e.g. the water absorptivity required for plant cultivation, shape retentivity and flexibility and a method of manufacture thereof. In the plant cultivating substrate and the method of its manufacture, at least water-retentive filling material, water, urethane prepolymer and polyol are reacted with each other.

17 Claims, 3 Drawing Sheets

FIG.3

| | Comparison Example1 | Comparison Example2 | Comparison Example3 | Comparison Example4 | Comparison Example5 | Comparison Example6 | Comparison Example7 |
|---|---|---|---|---|---|---|---|
| water-retentive filling material under water retaining condition (peat moss) (weight parts) | 100 | 100 | 100 | 100 | 100 | 100 | 100 |
| urethane prepolymer (weight parts) | 5 | 17 | 50 | 66.6 | 100 | 120 | 150 |
| polyester type polyol (weight parts) | 0 | 0 | 0 | 0 | 0 | 0 | 0 |
| polyether type polyol (weight parts) | 0 | 0 | 0 | 0 | 0 | 0 | 0 |
| water (weight parts) | 800 | 800 | 800 | 800 | 800 | 800 | 800 |
| ratio of water-retentive filling material under water retaining condition(%) | 95.2 | 85.5 | 66.7 | 60.0 | 50.0 | 45.5 | 40.0 |
| ratio of urethane prepolymer(%) | 4.8 | 14.5 | 33.3 | 40.0 | 50.0 | 54.5 | 60.0 |
| ratio of polyol(%) | 0 | 0 | 0 | 0 | 0 | 0 | 0 |
| dry peat moss (weight parts) | 60 | 60 | 60 | 60 | 60 | 60 | 60 |
| ratio of water-retentive filling material under dry condition(%) | 92.3 | 77.9 | 54.5 | 47.4 | 37.5 | 33.3 | 28.6 |
| ratio of urethane prepolymer(%) | 7.7 | 22.1 | 45.5 | 52.6 | 62.5 | 66.7 | 71.4 |
| ratio of polyol(%) | 0 | 0 | 0 | 0 | 0 | 0 | 0 |
| density(kg/m³) | 100 | 92 | 87 | 77 | 71 | 65 | 62 |
| shape retentivity | × | × | × | ○ | ○ | ○ | ○ |
| hardness (N) | — | — | 70 | 47 | 43 | 35 | 39 |
| restoring force (N) | — | — | 6 | 11 | 6 | 5 | 3 |
| water absorptivity(%) | 80 | 70 | 34 | 33 | 30 | 21 | 25 |
| cultivation evaluation (standard cultivation) | × | △ | △ | △ | △ | × | × |
| cultivation evaluation (waterculture) | × | × | △ | △ | △ | × | △ |

FIG.4

| | Example1 | Example2 | Example3 | Example4 | Example5 | Example6 | Example7 | Example8 | Example9 | Example10 |
|---|---|---|---|---|---|---|---|---|---|---|
| water-retentive filling material under water retaining condition (peat moss) (weight parts) | 100 | 100 | 180 | 100 | 100 | 100 | 100 | 100 | 100 | 100 |
| urethane prepolymer (weight parts) | 100 | 100 | 120 | 120 | 120 | 120 | 120 | 120 | 120 | 120 |
| polyester type polyol (weight parts) | 20 | 0 | 3 | 1 | 3 | 10 | 70 | 120 | 170 | 200 |
| polyether type polyol (weight parts) | 0 | 20 | 0 | 0 | 0 | 0 | 0 | 0 | 0 | 0 |
| water (weight parts) | 800 | 800 | 1440 | 800 | 800 | 800 | 800 | 800 | 800 | 800 |
| ratio of water-retentive filling material under water retaining condition(%) | 45.45 | 45.45 | 59.4 | 45.2 | 44.8 | 43.5 | 34.5 | 29.4 | 25.6 | 23.8 |
| ratio of urethane prepolymer(%) | 45.45 | 45.45 | 39.6 | 54.3 | 53.8 | 52.2 | 41.4 | 35.3 | 30.8 | 28.6 |
| ratio of polyol(%) | 9.1 | 9.1 | 0.9 | 0.5 | 1.3 | 4.3 | 24.1 | 35.3 | 43.6 | 47.6 |
| dry peat moss (weight parts) | 60 | 60 | 108 | 60 | 60 | 60 | 60 | 60 | 60 | 60 |
| ratio of water-retentive filling material under dry condition(%) | 33.3 | 33.3 | 46.8 | 33.1 | 32.8 | 31.6 | 24.0 | 20.0 | 17.1 | 15.8 |
| ratio of urethane prepolymer(%) | 55.6 | 55.6 | 51.9 | 66.3 | 65.6 | 63.1 | 48.0 | 40.0 | 34.3 | 31.6 |
| ratio of polyol(%) | 11.1 | 11.1 | 1.3 | 0.6 | 1.6 | 5.3 | 28.0 | 40.0 | 48.6 | 52.6 |
| density(kg/m³) | 78 | 77 | 108 | 64 | 66 | 69 | 96 | 109 | 135 | 140 |
| shape retentivity | ○ | △ | ○ | ○ | ○ | ○ | ○ | ○ | ○ | ○ |
| hardness (N) | 31 | 35 | 37 | 30 | 28 | 30 | 29 | 30 | 36 | 38 |
| restoring force (N) | 5 | 4 | 8 | 6 | 5 | 5.5 | 6.5 | 4 | 7 | 7 |
| water absorptivity (%) | 55 | 50 | 50 | 35 | 40 | 46 | 62 | 70 | 75 | 75 |
| cultivation evaluation (standard cultivation) | ◎ | ○ | △ | △ | △ | △ | ◎ | × | △ | △ |
| cultivation evaluation (waterculture) | △ | ○ | ○ | ◎ | ◎ | ○ | △ | × | × | × |

PLANT CULTIVATING SUBSTRATE AND METHOD OF ITS MANUFACTURE

This is a §371 of PCT/JP2004/008606 filed Jun. 18, 2004, which claims priority from Japanese Patent Application No: 2003-176107 filed Jun. 20, 2003.

TECHNICAL FIELD

The present invention relates to an artificial plant cultivating substrate usable, as a substitute for conventional soil, for cultivating a plant by surrounding roots thereof.

BACKGROUND ART

As methods of manufacturing such plant cultivating substrate, there are known a method of manufacturing it by mixing and reacting water-retentive filling material such as bark compost, chaff compost with aqueous solution or solvent dispersion of a small amount of urethane prepolymer and then allowing the mixture to cure, and a method of manufacturing by reacting and curing a suspension containing water-retentive filling material, water and urethane prepolymer (see, e.g. Patent Documents 1 and 2).

There is also known a method by pre-mixing water-retentive filling material and urethane prepolymer and then adding a small amount water to the resultant mixture for its reaction and curing (see e.g. Patent Document 3).

Patent Document 1: Japanese Patent Application Published No. 56-18165
Patent Document 2: Japanese Patent Application "Kokai" No. 2-20221.
Patent Document 3: Japanese Patent Application "Kokai" No.

DISCLOSURE OF THE INVENTION

Problem to be Solved by Invention

However, with the conventional manufacturing methods including the above-described methods disclosed in Patent Documents 1-3, except for various additives such as surface active agent added by trace amounts thereto, the principal agent to be mixed with the water-retentive filling material is limited mainly to urethane prepolymer, hence it has not been possible to manufacture a substrate not altogether satisfactory for plant cultivation. There has remained room for improvement in this respect.

More particularly, for a plant cultivating substrate, shape retentivity is required in view of ease of its handling. There are also required an appropriate water absorptivity for achieving healthy growth of the plant by prevention of root rot, as well as an appropriate flexibility (restorability) for appropriate air retention. Moreover, hardness suitable for sufficient growth of the plant root is also required. It has been difficult for the conventional manufacturing methods to manufacture a plant cultivating substrate which satisfies all of these requirements.

For instance, in the case of the above methods described in Patent Documents 1-3, there exists an upper limit in the amount of the urethane prepolymer relative to the water-retentive filling material. Hence, the ratios of the water-retentive filling materials in the respective cultivating substrates obtained are high, such as from 90 to 99 wt. % (Patent Document 1), from 70 to 99 wt. % (Patent Document 2), and from 50 to 85 wt. % (Patent Document 3).

One of the above-described Patent Documents cites, as the reason for the setting of the upper limit in the content of the urethane prepolymer, tendency of the plant cultivating substrate per se becoming too hard and describes that this will "increase the resistance against extension of the plant root, thus adversely affecting the growth". On the other hand, if conversely the amount of urethane prepolymer is too small, it is not possible to maintain the shape retentivity required for plant cultivating substrate, so that the substrate, when held in a hand, the filling material will crumble and fall off or break. In this respect too, there has been room for improvement.

The present invention addresses to such problems of the prior art and its object is to provide a plant cultivating substrate which satisfies the water absorptivity required for plant cultivation, shape retentivity, flexibility (restorability) and hardness and a method of manufacture thereof.

Solutions to the Problem

According to the first characterizing feature of the present invention, a plant cultivating substrate is formed by reacting at least water-retentive filling material, water, urethane prepolymer and polyol.

According to the second characterizing feature of the present invention, a ratio of said water-retentive filling material under dry condition there of is from 15 to 60 wt. %.

According to the third characterizing feature of the present invention, said polyol comprises a polyol containing an ester group.

According to the fourth characterizing feature of the present invention, a method of manufacturing a plant cultivating substrate by reacting and curing a suspension containing water-retentive filling material, water and urethane prepolymer, wherein said suspension contains polyol, the method preparing the suspension such that a ratio of said water-retentive filling material under dry condition there of is from 15 to 60 wt. % and then reacting and curing the resultant suspension containing the polyol, thus obtaining the plant cultivating substrate.

According to the fifth characterizing feature of the present invention, an amount of said polyol is from 0.1 to 300 weight parts, relative to 100 weight parts of said water-retentive filling material under the dry condition thereof.

According to the sixth characterizing feature of the present invention, the method comprises a first step of preparing a first suspension by stirring/mixing said water-retentive filling material with water and a second step of adding said urethane prepolymer and said polyol to said first suspension and then stirring/mixing the resultant mixture to obtain a second suspension, said second suspension being reacted and cured to obtain the substrate.

According to the seventh characterizing feature of the present invention, said suspension is cured within a substrate forming mold.

According to the eighth characterizing feature of the present invention, said curing is effected such that an upper face of the plant cultivating substrate may be located on the side of a bottom of said substrate forming mold.

According to the ninth characterizing feature of the present invention, said water-retentive filling material contains at least one filling material selected from the group consisting of peat moss, coco peat, sawdust, coconut husk, chaff, chaff compost, bark compost, pearlite, vermiculite, and hydrophilic foam resin pulverized powder.

According to the tenth characterizing feature of the present invention, the plant cultivating substrate manufactured by the manufacturing method according to any one of the fourth through the ninth characterizing features, wherein the substrate has water absorptivity of from 25 to 75%, hardness of from 20 to 40N, and restoring force of from 4 to 10N.

Effects of the Invention

According to the first characterizing feature of the present invention, by reacting at least water-retentive filling material, water, urethane prepolymer and polyol, there can be obtained a novel plant cultivating substrate which satisfies the water absorptivity required for plant cultivation, shape retentivity and flexibility (restorability), hardness, etc. altogether.

According to the second characterizing feature of the present invention, in obtaining the plant cultivating substrate by reacting at least water-retentive filling material, water, urethane prepolymer and polyol, adjustment is made such that a ratio of said water-retentive filling material under dry condition thereof is from 15 to 60 wt. %. With this, it has become possible to obtain a novel plant cultivating substrate which satisfies the water absorptivity required for plant cultivation, shape retentivity and flexibility (restorability), hardness, etc. altogether.

According to the third characterizing feature of the present invention, by using a polyol containing an ester group as said polyol, it has become possible to obtain in a more efficient manner a novel plant cultivating substrate which satisfies the water absorptivity required for plant cultivation, shape retentivity and flexibility (restorability), hardness, etc. altogether.

According to the fourth characterizing feature of the present invention, by reacting and curing a suspension containing water-retentive filling material, water and urethane prepolymer, wherein said suspension further contains polyol, the method preparing the suspension such that a ratio of said water-retentive filling material under dry condition thereof is from 15 to 60 wt. % and then reacting and curing the resultant suspension containing the polyol, thus obtaining the plant cultivating substrate. With this, it has become possible to obtain a plant cultivating substrate which satisfies the water absorptivity required for plant cultivation, shape retentivity and flexibility (restorability), hardness, etc. altogether.

That is, as will become apparent from the experiment results to be described later, through the various experiments conducted by the present inventors, there was obtained a new finding that in reacting and curing a suspension containing water-retentive filling material, water and urethane prepolymer, if this suspension contains polyol, this will lessen the hardness, enhance the shape retentivity and significantly improve the water absorptivity of the plant cultivating substrate manufactured.

And, through various experiments continuously conducted based on the above finding, there could be obtained a plant cultivating substrate with which even when the amount of the urethane prepolymer is extremely increased relative to the water-retentive filling material as compared with the conventional techniques, for the purpose of e.g. maintaining shape retentivity required for plant cultivating substrate, with addition thereto of an appropriate amount of polyol, there will not occur excessive curing which hinders the growth of the root and water absorptivity and flexibility can also be secured, hence, the plant cultivating substrate having the water absorptivity, shape retentivity and flexibility (restorability), hardness suitable for the growth of the plant root.

According to the fifth characterizing feature of the present invention, an amount of said polyol is from 0.1 to 300 weight parts, relative to 100 weight parts of said water-retentive filling material under the dry condition thereof. Hence, it is possible to reliably manufacture a plant cultivating substrate which is even superior in all the respects of the above-described water absorptivity, shape retentivity and flexibility (restorability), and hardness. Incidentally, this does not mean that the manufacturing method employs the water-retentive filling material which has been dried, but only describes the addition amount of the polyol relative to 100 weight parts of the water-retentive filling material which is forcibly dried.

According to the sixth characterizing feature of the present invention, in the first step, a first suspension is prepared by stirring/mixing said water-retentive filling material with water. Therefore, in this first suspension, the water-retentive filling material retains a sufficient amount of water.

Then, in the second step, said urethane prepolymer and said polyol are added to said first suspension and then the resultant mixture is stirred and mixed to obtain a second suspension. Thereafter, this second suspension is reacted and cured. Therefore, the water present around the water-retentive filling material contributes to the curing. As a result, the texture of the plant cultivating substrate is rendered uniform. Thus, it is possible to manufacture a plant cultivating substrate having the water absorptivity required for plant cultivation, shape retentivity and flexibility (restorability), hardness, uniformly over the entire substrate.

According to the seventh characterizing feature of the present invention, said suspension is cured within a substrate forming mold. Therefore, a plant cultivating substrate having a desired shape can be manufactured easily.

According to the eighth characterizing feature of the present invention, said curing is effected such that an upper face of the plant cultivating substrate may be located on the side of a bottom of said substrate forming mold. Hence, the upper face of the plant cultivating substrate can be formed with beautiful finish. Then, when this plant cultivating substrate is used e.g. as being accommodated within a plant cultivating container for planting a decorative plant, as the upper face thereof catching people' attention has such beautiful finish, the commercial value will be increased. Further, if it is desired to form a cut for transplanting in the upper face of the plant cultivating substrate, such cut can be formed easily.

According to the ninth characterizing feature of the present invention, said water-retentive filling material contains at least one filling material selected from the group consisting of peat moss, coco peat, sawdust, coconut husk, chaff, chaff compost, bark compost, pearlite, vermiculite, and hydrophilic foam resin pulverized powder. Hence, the water absorptivity required for plant cultivation can be ensured. Further, by appropriately selecting a kind of filling material, depending on e.g. the type of plant to be cultivated, or selecting plural kinds of filling material included in the above-described group and using them together in appropriate mixing ratios, it is possible to reduce the manufacturing cost while maintaining the water absorptivity required for the plant to be cultivated.

According to the tenth characterizing feature of the present invention, the plant cultivating substrate manufactured by the manufacturing method according to any one of the fourth through the ninth characterizing features, wherein the substrate has water absorptivity of from 25 to 75%, hardness of from 20 to 40N, and restoring force of from 4 to 10N. Hence, there can be obtained a plant cultivating substrate having which is superior in all of the water absorptivity, shape retentivity and flexibility (restorability), and hardness.

BEST MODE OF EMBODYING THE INVENTION

Regarding a plant cultivating substrate and a method of manufacturing this plant cultivating substrate relating to the present invention, embodiments thereof will be described with reference to the accompanying drawings and experiment results.

This plant cultivating substrate can be used in e.g. a planter device for cultivating with a planter container being afloat in water. This floating type planter device, as shown in FIG. 1 and FIG. 2, includes a planter container 2 accommodating a plant cultivating substrate 1, a water reserving container 3 for reserving water W for planting, a planting tool 4 for maintaining the floating condition of the planter container 2, and so on, so that the planter device is used for cultivating a plant P planted in the plant cultivating substrate 1.

The planter container 2 is formed as a bottomed cylindrical member made of e.g. hollow resin having a smaller specific gravity than water, so as to float adjacent a surface of the reserved water W. Adjacent the center at the bottom, there is formed a water flooding hole 2a extending therethrough substantially perpendicularly.

The planting tool 4 is provided for maintaining an appropriate posture of the planter container 2 shown in FIGS. 1 and 2 even when the center of gravity is shifted upward in association with growth of the plant P, i.e. provided for preventing toppling of the plant P. From the upper end edge of the planting tool 4, total of four posture-maintaining retaining portions 4a project outward in an obliquely upward direction. In operation, when the planting tool 4 is placed within the water reserving container 3, these retaining portions 4a will be retained to the opening edge of the water reserving container 3, whereby the planting tool 4 will be maintained in position with its upper edge being kept horizontal and at the same time there will be formed a space for receiving the water W between the bottom face of the planting tool 4 and the bottom face of the water reserving container 3. Further, in the periphery and the bottom of the planting tool 4, there are formed water-passing holes 4b for allowing passage of the water W. Also, to one of the retaining portions 4a, there is attached, via a chain 5, an indicator 6 for indicating e.g. the kind of the plant P.

According to this floating type planter device, as the planter container 2 is floated in the reserved water W, the reserved water W is constantly supplied to the plant cultivating substrate 1 via the water flooding hole 2a, thereby to promote growth of the plant P planted in this plant cultivating substrate 1. And, when the plant P has grown to increase in its mass, this will result in corresponding increase in the amount of sinking of the planter container 2 relative to the reserved water W, so that a greater amount of water W can be supplied to the plant cultivating substrate 1. As a result, an amount of water W corresponding to and suitable for the speed of growth of the plant P can always be supplied to the plant P for its cultivation.

And, as the planting tool 4 maintains appropriately the posture of the planting container 2 floating in the water W, even when the center of gravity is shifted upwardly or laterally in association with the growth of the plant P, the floating posture of the planter container 2 can be maintained in a stable manner, thus preventing toppling of the plant P.

The plant cultivating substrate 1 according to the present invention is made by curing of a suspension containing water-retentive filling material, water and urethane prepolymer. The characterizing feature thereof lies in that the suspension contains polyol.

The plant cultivating substrate of the present invention comprises a plant cultivating substrate formed by reacting at least water-retentive filling material, water, urethane prepolymer and polyol and the ratio of the water-retentive filling material under its dry condition therein being from 15 to 60 wt. %.

Incidentally, the above-described ratio of the water-retentive filling material is a value calculated by using a following equation not including the weight of water added in the denominator (all of the addition amounts in the equation are weight parts). Further, in the present embodiment, both a ratio of the water-retentive filling material under naturally water retaining condition as the water-retentive filling material under water retaining condition thereof and a ratio of the water-retentive filling material under forcibly dewatered condition as the water-retentive filling material under a dry condition thereof are calculated. When the plant cultivating substrate 1 is actually manufactured, there will be used water-retentive filling material under naturally water retaining condition as shipped from its manufacturer.

ratio of water-retentive filling material(%)={addition amount of water-retentive filling material/(addition amount of water-retentive filling material+addition amount of urethane prepolymer+addition amount of polyol)}×100    (formula 1)

In the present invention, by the addition of polyol, it is possible to lessen the hardness of the resultant plant cultivating substrate, enhance its shape retentivity and to significantly improve its water absorptivity as well.

Preferably, by calculating a ratio of the water-retentive filling material in the plant cultivating substrate based on the water-retentive filling material under its dry condition and setting this ratio to from 15 to 60 wt. %, it is possible to obtain the target plant cultivating substrate of the invention having appropriate flexibility (restorability), hardness, shape retentivity and water absorptivity all together.

Namely, if the ratio of the water-retentive filling material under its dry condition falls below 15 wt. %, the relative amount of the water-retentive filling material will be small, thus requiring a large amount of polyol for increasing the water absorptivity. Or, there tends to result in excessively strong flexibility (restoring force) characteristic with polyurethane foam. Conversely, if the ratio exceeds 60 wt. %, this may result in deterioration of the shape retentivity.

Regarding the kind of the water-retentive filling material, any kind can be employed as long as it can retain moisture in such a manner to be readily absorbed by the roots of the plant P. For instance, there can be employed one or more kinds selected from the group consisting of materials made of plant fibers such as peat moss, coco peat, sawdust, coconut husk, chaff, chaff compost, bark compost, bog moss, strained lees of coffee, etc, inorganic materials such as rock wool, pearlite, vermiculite, etc. and hydrophilic foam resin pulverized powder.

Of these kinds of filling materials, it is preferred to employ one or more kinds selected from the group consisting of peat moss, coco peat, sawdust, coconut husk, chaff, chaff compost, bark compost, pearlite, vermiculite, etc. and hydrophilic foam resin pulverized powder which materials have good water retentivity, relatively small bulk density and good dispersibility which makes it possible to readily obtain uniform texture when the material is foamed and which are readily available also.

The urethane prepolymer is an urethane prepolymer having an isocyanate group at the end, specifically a compound obtained by reacting an isocyanate compound with a polyol.

As the isocyanate compound, toluene diisocyanate is preferred, in view of the readiness of handing due to its viscosity.

As the polyol, it is preferred that the polyol contain a relatively large amount of ethylene oxide in order to enhance the reactivity of the urethane prepolymer with water. Further, it is also possible to select and mix more than two kinds of polyol which differ from each other in the molecular weight, the number of functional groups, or the content of the ethylene oxide. However, the polyol having a hydrophobic group is not desirable since this may reduce the water absorptivity of the plant cultivating substrate.

As the methods of manufacturing the plant cultivating substrate of the invention, there are the following first through third methods for example.

(First Method)

A method of dispersing urethane prepolymer in water, then mixing this with the water-retentive filling material and the polyol and allowing the resultant mixture to be cured.

(Second Method)

A method of stirring and mixing the water-retentive filling material and the urethane prepolymer, then mixing this with water and the polyol and allowing the resultant mixture to be cured.

(Third Method)

A method of mixing and stirring the water-retentive filling material and water to prepare suspension, then mixing this suspension with the urethane prepolymer and the polyol and allowing the resultant mixture to be cured.

In the case of the first method, depending on the amount of water or the degree of activity of the urethane prepolymer, water-paste-like condition is formed, which makes uniform mixing with the water-retentive filling material difficult. Hence, there is tendency of the urethane prepolymer used being limited.

In the case of the second method, a special agitator is needed for mixing the water-retentive filling material with the urethane prepolymer. Further, the entire periphery of the water-retentive filling material may be coated with the resin, so that the resultant substrate may become too hard to allow extension and growth of the plant root.

The third method is free from the inconveniences of the first and second methods. Hence, in this respect, it may be said that this third method is the most preferred method.

That is to say, according to the characterizing feature of the third method, the method comprises a first step of preparing a first suspension by stirring/mixing the water-retentive filling material with water and a second step of adding said urethane prepolymer and said polyol to said first suspension and then stirring/mixing the resultant mixture to obtain a second suspension, said second suspension prepared by the second step being reacted and cured to obtain the substrate.

According to this third method, at the first step, the water-retentive filling material is wetted with water to retain a sufficient amount of water therein. And, at the next second step, the urethane prepolymer and the polyol are added to the first suspension obtained at the first step and then stirred and mixed together. Therefore, the water present around the water-retentive filling material and the urethane prepolymer are reacted, whereby the texture of the plant cultivating substrate is rendered uniform. Moreover, with the addition of the polyol, it is possible to manufacture a plant cultivating substrate having all of the water absorptivity required for plant cultivation, shape retentivity, flexibility (restorability) and hardness.

Incidentally, when the addition amount of the polyol is large, the polyol may first be added to the first suspension and stirred and mixed together to obtain the second suspension. Thereafter, the urethane prepolymer may be added thereto and stirred and mixed together.

With whichever of the above-described first through third methods being adopted, at the last stage, the resultant mixture will be cured by the slab method or mold method to obtain the plant cultivating substrate.

The slab method is a method in which the material is reacted and cured in the form of a large block (slab) having a large width and extending longitudinally in the form of a thick plate. Then, this block obtained by the curing will be cut into a predetermined shape to obtain the plant cultivating substrate.

The mold method is a method which uses a substrate forming mold consisting of a lower mold alone or a substrate forming mold consisting of a lower mold and an upper mold, the material being reacted and cured within such mold(s). The mold method is more advantageous than the slab method in that the mold method hardly requires the cutting of the substrate after curing thereof and there is no risk of the water-retentive filling material being crumbling down from the cut face during the cutting operation.

Further, when the mold method is adopted, it is preferred that the curing be effected with the upper face of the plant cultivating substrate being located on the bottom side of the lower mold.

That is, in the case of using the substrate forming mold consisting of a lower mold alone, there will be formed a film-like hardened layer called "skin" upwardly of the plant cultivating substrate obtained by curing. Further, in the case of using the substrate forming mold consisting of a lower mold and an upper mold, through a gas drain hole provided in the upper mold, a portion of the material will flow out together with the reaction gas and then cured. Therefore, whichever type of mold is employed, it is difficult to finish the upper face side as a beautiful and smooth face.

On the other hand, the bottom face side thereof will be finished as a beautiful and smooth face, whichever type of mold is employed. Therefore, by effecting the curing with the upper face side of the plant cultivating substrate being located on the bottom face side of the lower mold, the upper face of the plant cultivating substrate can be finished beautifully, thus improving the commercial value. Further, if the curing is effected with the upper face side of the plant cultivating substrate being located on the bottom face side of the lower mold, when it is desired to form a plant transplanting cut in the upper face of the finished plant cultivating substrate, such cut can be formed easily and effectively, since no skin is formed on the upper face of the plant cultivating substrate.

Next, there will be discussed the mixing ratios of the urethane prepolymer and the polyol relative to the water-retentive filling material.

As the result of various experiments conducted, it was found out that the addition amount of the urethane prepolymer preferably be from 50 to 300 weight parts approximately relative to 100 weight parts of the water-retentive filling material under its dry condition, with the ratio of this dry water-retentive filling material being from 15 to 60 wt. %. It was found that preferably, an urethane prepolymer having such activity as the reaction and curing thereof being completed within 30 minutes after its addition be selected and this prepolymer be added in the addition amount of about from 120 to 200 weight parts, relative to the 100 weight parts of the dry water-retentive filling material.

Incidentally, in the case of the urethane prepolymer being below 50 weight parts, the resultant plant cultivating substrate becomes brittle with poor shape retentivity. Whereas, in the case of the urethane prepolymer exceeding 300 weight parts, due to the corresponding decrease in the relative ratio of the water-retentive filling material, the resultant plant cultivating substrate will have poor water absorptivity. Further, if the urethane prepolymer exceeds 300 weight parts, the resultant substrate will have an excessively high resin strength or will be like a high impact-resilience urethane foam having high resilience. And, such resilience makes extension of the plant root difficult, so that good cultivating effect cannot be obtained.

Next, regarding the addition amount of the polyol, it is preferred that the amount be in the range of from 0.1 to 300 weight parts relative to 100 weight parts of the water-retentive filling material under the dry condition thereof. Within this range, it is possible to freely control the water absorptivity of the plant cultivating substrate. Incidentally, it was found out that no increase in the water absorptivity can be expected, with the polyol addition amount being below 0.1 weight part, whereas, with the addition amount exceeding 300 weight parts, the addition, even if effected, will result in substantially no change in the water absorptivity.

Further, the addition amount of water is not particularly limited. However, it is preferred that this amount be in the range of from 80 to 2000 weight parts, relative to the 100 weight parts of the dry water-retentive filling material and it is particularly preferred that the amount be from 300 to 1500 weight parts.

In the above, there have been described the addition amounts of the urethane prepolymer, the polyol, and water, all relative to 100 weight parts of the water-retentive filling material under the dry condition thereof. However, as described hereinbefore, this does not mean that the manufacturing method uses the water-retentive filling material under its dry condition.

Further, by utilizing the invention's manufacturing method, it is also possible to employ a filing material other than the water-retentive filling material, such as a known additive conventionally employed in the manufacture of urethane foam, exemplified by compost, antibacterial agent, pigment, foam conditioning agent, surface active agent. etc.

Next, there will be described results of analyses conducted from various aspects, regarding the physical properties of the plant cultivating substrate manufactured by such manufacturing method according to the present invention.

As described hereinbefore, the water absorptivity of the invention's plant cultivating substrate increases in proportion with the addition amount of the polyol. Namely, if the addition amount of the polyol is varied, with the addition amounts of the other raw materials being fixed, the value of the water absorptivity can be freely adjusted. With selection of this value of water absorptivity, it becomes readily possible to cope with a plant cultivating substrate for standard cultivating method to a plant cultivating substrate for a special use such as waterculture.

As the criteria of the water absorptivity, in the case of the standard cultivating method, it is favorable to employ a substrate having water absorptivity of from 50% to 75%. In the case of a special cultivating method such as waterculture, it is favorable to employ a substrate having water absorptivity of from 25% to 55%.

That is to say, according to the present invention, only by varying the addition amount of the polyol, the water absorptivity of the plant cultivating substrate can be freely controlled. Hence, depending on the plant to be cultivated, it is readily possible to manufacture a plant cultivating substrate having a water absorptivity suitable therefor.

Further, regarding the hardness of the plant cultivating substrate, the hardness ranging from 20 to 40N is appropriate. On the other hand, regarding the restoring force, the range from 4 to 10N is appropriate. Incidentally, the restoring force means a repellent force exerted from the growing plant under a load to make this load to zero.

That is, in association with growth of the plant, its roots will increase and extend, so that the inside of the container such as the planter pot will be filled with the roots eventually. In such case, in the case of a plant cultivating substrate having high so-called friability, in other words, high irreversible compressive characteristics, the roots will crush the plant cultivating substrate per se, thus eliminating porous gaps as air supply sources.

Therefore, the plant cultivating substrate should have a certain degree of restoring force (4 N or more). However, if the force exceeds 10N, the substrate will repel the force coiling of the roots when the roots coil to substrate, thus hindering good growth. Therefore, the appropriate range of the restoring force is from 4 to 10 N.

Next, there will be described some of the various kinds of experiments conducted in order to confirm the effect of the present invention.

The table in FIG. 3 shows results of evaluations made on plant cultivating substrate samples (Comparison Examples 1-7) manufactured by methods including the conventional methods, without addition of the polyol. The table in FIG. 4 shows results of evaluations made on plant cultivating substrate samples (Examples 1-10) manufactured by the manufacturing method of the present invention.

Incidentally, for manufacturing the samples of Examples and Comparison Examples, the following raw materials were used.

As the water-retentive filling material, there was employed a peat moss (trade name Tourbesol manufactured by Sansei Bussan Co., Ltd. (fine particles) having a moisture content of about 40% as determined by an electronic moisture meter (model: MC-30MB) manufactured by Cho Instruments Co., Ltd.).

As the urethane prepolymer, there was employed an urethane prepolymer containing from 11 to 13% isocyanate group (NCO), which was obtained by reacting 1000 g of polyol (trade name: ACTCOL EP-505S manufactured by Mitsui Takeda Chemicals Inc.) having a molecular weight of about 3400 and formed by random addition polymerization of ethylene oxide and propylene oxide in the ratio of 60/40 to glycerin and 525 g of isocyanate (trade name: CORONATE T-80 manufactured by Nippon Polyurethane Industry Ltd.) inside a four-neck flask under nitrogen gas flow at 80±2° C. for 2 hours.

As a polyester type polyol, there was employed a mixture of polyester modified polyether polyol and polyether polyol (trade name: ACTCOL 3p56b manufactured by Mitsui Takeda Chemicals Inc.)

As the polyether type polyol, there was employed ACT-COL MN3050S trade name: manufactured by Mitsui Takeda Chemicals Inc.

The samples of the Examples and Comparison Examples were manufactured by the following method in accordance with the blending recipe shown in FIG. 3 and FIG. 4. Incidentally, FIG. 3 and FIG. 4 show blending quantities relative to 100 weight parts of the water-retentive filling material under water-retaining condition thereof.

Into an appropriate container, water and the water-retentive filling material were charged and then stirred and mixed together to prepare the first suspension. Next, to this first suspension, the urethane prepolymer and the polyol were added and further stirred and mixed together to obtain the second suspension. This was introduced into a substrate forming mold consisting of only a lower mold. After the second suspension was reacted and cured within the substrate forming mold, the excess portion exceeding the upper edge of the mold was cut away, thereby to obtain a uniform plant cultivating substrate sample.

As the substrate forming mold, three kinds of molds, i.e. a first mold, a second mold, and a third mold, differing in the shape and dimensions from each other as follows were prepared.

The inner shape of the first mold is a truncated quadrangular pyramid (that is, a shape obtained by horizontally cutting away the top of a pyramid), with its upper end face being 4.5 cm square rectangular, its lower end face being 3.0 cm squire rectangular, its height being 5 cm.

The inner shape of the second mold is also a truncated quadrangular pyramid, with its upper end face being 3.5 cm square rectangular, its lower end face being 2.5 cm squire rectangular, its height being 4 cm.

The inner shape of the third mold is a truncated cone tapered toward its lower end, with its upper end face being 7 cm square rectangular, its lower end face being circular with a diameter of 6 cm, its height being 6.5 cm.

Incidentally, the method of evaluating the samples of the plant cultivating substrates obtained in accordance with the respective Examples and the Comparison Examples is as follows.

For the determinations of the shape retentivity, water absorptivity, hardness, and flexibility, samples formed into the truncated pyramid shape using the first mold were employed.

About the shape retentivity: after generally assumed manner of handling thereof, samples which showed the crumbling of the plant cultivating sample (simply, "sample" hereinafter) or falling off of much of the water-retentive filling material are indicated with (X), samples which showed no crumbling of the sample, but falling off of some of the water-retentive filling material are indicated with (Δ), and samples which showed almost no crumbling of the sample or little falling of the water-retentive filling material are indicated with (◯), with these conditions being visually confirmed.

About the water absorptivity: the sample which was dried until the rate of change in its weight remained within 1% in an oven kept at 80° C. has a dry weight: M1 (g). Then, distilled water was introduced into a container made of stainless steel having inner face dimensions of: 100×100×50 (mm) to a water depth of 1 cm, and the sample was placed inside this container and kept therein for 24 hours. Thereafter, the sample was removed out of the container and its total weight: M2 (g) was determined. By subtracting M1 from M2, an absorbed water weight (g)=(M2−M1) was obtained. With the specific weight of water being 1, the absorbed water volume $(cm^3)$=(M2−M1). The result was divided by a difference obtained by subtracting a resin volume (calculated from the above-described M1 with the specific weight of the sample being 1) from the total volume (calculated based on the volume of the mold), thus obtaining the water absorptivity. Namely, the water absorptivity was calculated from the following formula.

$$\text{water absorptivity}(\%) = \{(M2-M1)/(\text{total volume of sample}-M1)\} \times 100 \quad \text{(formula 2)}$$

In the case of Comparison Examples 6 and 7, the water absropvities thereof were so small that even after being left for 24 hours, the samples did not yet absorb water to the upper faces thereof. Therefore, for determination of the maximum water absorptivity, water was sprinkled over the upper face of the sample for 30 minutes to be absorbed therein and this was further left for 24 hours within the container having the water depth of 1 cm. Then, the weight of this sample was determined as M2 (g).

As described below, for the determinations of the hardness and the restorability, the samples which had absorbed sufficient amounts of water in the water absorptivity determining method were employed.

About hardness: with using a foam hardness metering device JIS-K6400, the sample was placed at the center on the table of the metering device, with an upper end face of the sample being oriented downward. Then, a load of 5N (0.5 kgf) was applied to the sample by means of a pressurizing plate. Under this condition, the thickness of the sample was read to 0.1 mm and this was used as the initial thickness. Next, the pressurizing plate was pressed into the sample at the speed of 300±20 mm per minute by a distance corresponding to 50±2.5% of the initial thickness. When 20 seconds lapsed after the plate became still, the load was read to 1 N (0.1 kgf). This value was obtained as the hardness.

About the restoring force: with using the foam hardness metering device JIS-K6400, the sample was placed at the center on the table of the metering device, with the upper end face of the sample being oriented downward. Then, the load of 5N (0.5 kgf) was applied to the sample by means of the pressurizing plate. Under this condition, the thickness of the sample was read to 0.1 mm and this was used as the initial thickness. Next, when the pressurizing plate was pressed into the sample at the speed of 300±20 mm per minute by the distance corresponding to 50±2.5% of the initial thickness, the load G1 was read to 1 N (0.1 kgf). When 20 seconds lapsed after the plate became still, the load G2 was read to 1 N (0.1 kgf). And, the value: G1−G2 was obtained as the restoring force (the repellent force exerted from the pressurizing plate to render the load to zero).

For the evaluations of cultivations, in the respective Comparison Examples and Examples, the evaluations were carried out by a standard cultivating method with one or two times of watering per day and a water culture method for cultivating the plant within a cultivating container having a water depth constantly kept at from 0.5 to 1 cm. As the samples, the samples formed into the truncated pyramid shape using the second mold were employed. For the evaluation of cultivation, petunias under substantially same growing conditions were planted in the samples of the respective plant cultivating substrates. After cultivations for a predetermined period (from 1 to 3 months), the fresh weight (weight of the plant immediately after cutting off of the underground portion thereof of each plant was determined as the evaluation.

The sample which showed the best growth of the plant, i.e. the plant giving the largest fresh weight after the predetermined period of cultivation was evaluated as ⊚. The samples giving fresh weights corresponding to from 80 to 100, relative to the fresh weight 100 of the sample evaluated as ⊚ were evaluated as ◯. Similarly, the samples giving fresh weights corresponding to from 50 to 80 were evaluated as Δ. The samples giving only fresh weights below 50 were evaluated as X.

As the result, in the standard culture method, Examples 1 and 7 showed the best growth. Examples 2 and 8 showed the second best growth. In the case of the waterculture method, Examples 4 and 5 showed the best growth, and Examples 2, 3 and 6 showed the second best growth.

Incidentally, into the samples with the above-described dimensions (truncated pyramid shape) of Example 4, there were planted, *Verbena, Torenia Fournieri, Fuchsia, Impatiens*, Rose, *Viola, Bacopa, Pratia, Linaria, Lobelia, Begonia*,

*Nemesia*, Poinsettia, *Cyclamen, Kalanchoe, Sedum, Muehlenbekia, Peperomia*, Spider Plant, *Lysimachia, Tradescantia, Hedera, Plectranthus, Coleus, Pumila, Vireya, Hypoestes*, Wood's *Ceropegia*, Green Necklace, Acorn, *Sansevieria*, Watercress, Mint, Basil, Chamomile, Lavender. And these were water-cultured for from 1 to 3 months. As the results, all of these plants showed good growths.

Further, *petunia* planted in the sample of Example 4 formed into the predetermined truncated conical shape using the third mold was water-cultured for 1 month. As the result, the plant showed uniform rooting and good growth.

Incidentally, the table in FIG. 3 shows the results of analysis to find out whether a substrate having appropriate degrees of both shape retentivity and water absorptivity required for plant cultivation could be obtained with progressive increase in the ratio of urethane prepolymer in accordance with extension of the prior art. From this table, it is understood that with increase of the urethane prepolymer to the substrate alone according to the conventional art, it is not possible to provide a substrate having both the required shape retentivity and water absorptivity.

Incidentally, in the table of FIG. 4, in Example 1 and Example 2, analyses were conducted with one of aims thereof being to find out what differences in physical properties would result between the case of using a polyester type polyol and the further case of using a polyether type polyol, as the polyol to be added. From this, it is understood that the polyester type polyol is superior to the polyether type polyol in the respects of both the shape retentivity and the water absorptivity.

Further, in Examples 3-10, analyses were conducted with one of aims thereof being to find out the influence on the water absorptivity of differences in the addition amounts of the water-retentive filling material and the polyol, with the amount of the urethane prepolymer being fixed at 120 weight parts. From Examples 4-10, it is understood that with the progressive increase in the addition amount of the polyol, the water absorptivity increases also. However, from Examples 9 and 10, it is understood that the upper limit of the polyol addition amount is 170 weight parts and even with further increase thereof, no conspicuous increase in the water absorptivity can be expected.

Incidentally, the ratios of the water-retentive filling material based on water-retaining conditions thereof are also included for reference in FIG. 3 and FIG. 4.

INDUSTRIAL APPLICABILITY

This is an invention relating to an artificial plant cultivating substrate usable as a substitute for soil for cultivating a plant by surrounding roots thereof and to a method of its manufacture. With the characterizing feature that the substrate is formed by reacting at least water-retentive filling material, water, urethane prepolymer and polyol. Preferably, a ratio of said water-retentive filling material under dry condition there of is from 15 to 60 wt. %. Hence, there has been provided a plant cultivating substrate having all of the water absorptivity required for plant cultivation, shape retentivity, flexibility (restorability) and hardness and a method of manufacture thereof.

BRIEF DESCRIPTION OF THE DRAWINGS

FIG. 3 is a table showing experiment results of the plant cultivating substrate.

FIG. 4 is a table showing experiment results of the plant cultivating substrate.

Figure 1:
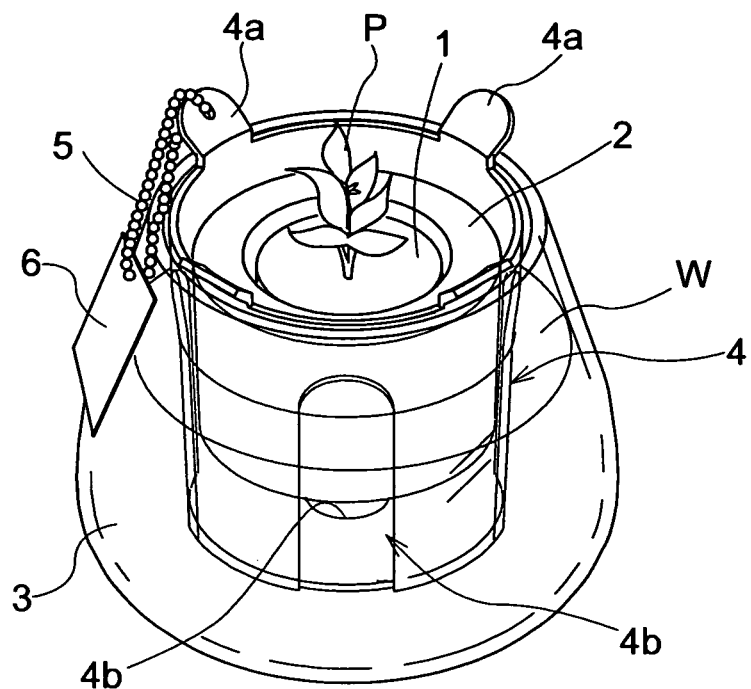
FIG. 1 is a perspective view of a floating type planter device using a plant cultivating substrate.
Figure 2:
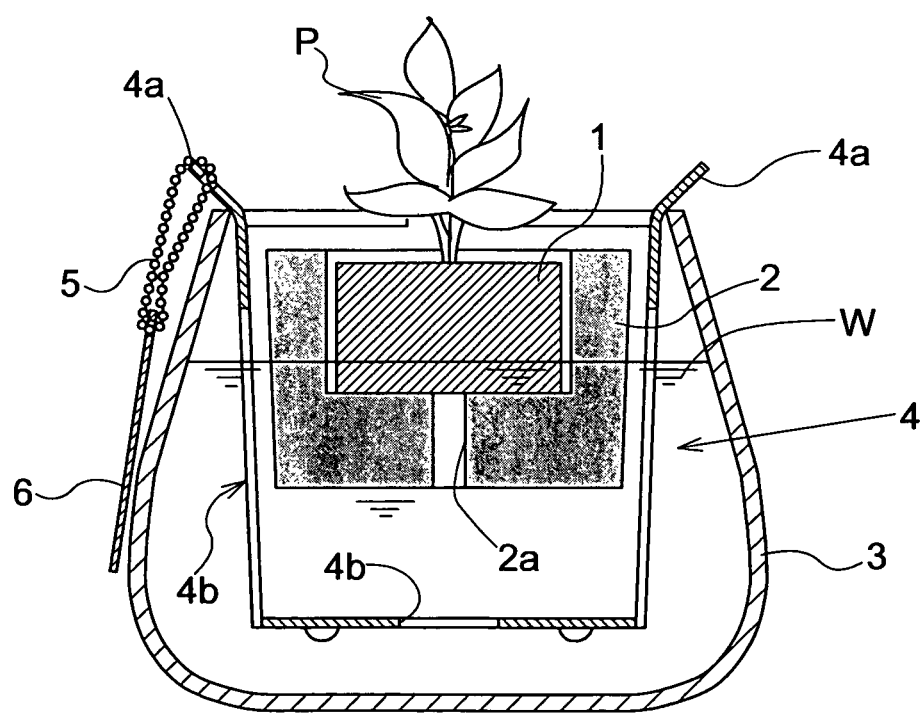
FIG. 2 is a section view of the floating type planter device using the plant cultivating substrate.

DESCRIPTION OF REFERENCE MARKS 1 plant cultivating substrate
2 planter container
3 water reserving container
4 planting tool
P plant
W reserved water

The invention claimed is:

1. A plant cultivating substrate produced by reacting:
   a water-retentive filling material, water, urethane prepolymer and a polyol under conditions which form a plant cultivating substrate.

2. The plant cultivating substrate of claim 1, wherein said water retentive filling material under dry conditions is from 15 to 60 wt. % of said plant cultivating substrate.

3. The plant cultivating substrate of claim 1, wherein said polyol contains an ester group.

4. The plant cultivating substrate of claim 1, wherein the polyol is present in an amount of from 0.1 to 300 weight parts relative to 100 weight parts of the water-retentive filling material under dry conditions.

5. The plant cultivating substrate of claim 1, wherein said urethane prepolymer contains an isocyanate group.

6. The plant cultivating substrate of claim 5, wherein said urethane prepolymer is formed by reacting toluene diisocyanate with a polyol.

7. The plant cultivating substrate of claim 1, wherein said urethane prepolymer is present in an amount of from 50 to 300 weight parts relative to 100 weight parts of the water-retentive filling material under dry conditions.

8. The plant cultivating substrate of claim 7, wherein said urethane prepolymer is present in an amount of from 120 to 200 weight parts relative to 100 weight parts of the water-retentive filling material under dry conditions.

9. The plant cultivating substrate of claim 1, wherein said water-retentive filling material comprises: peat moss, coco peat, sawdust, coconut husk, chaff, chaff compost, bark compost, pearlite, vermiculite, or hydrophilic foam resin pulverized powder.

10. The plant cultivating substrate of claim 1, wherein the substrate has water absorptivity of from 25% to 75% by weight relative to the weight of said plant cultivating substrate, hardness of from 20N to 40N, and restoring force of from 4N to 10N.

11. A method of manufacturing a plant cultivating substrate comprising reacting and curing (i) a water-retentive filling material, (ii) water, (iii) a urethane prepolymer and (iv) a polyol, wherein said water-retentive filling material under dry conditions is from 15 to 60 wt. % of said plant cultivating substrate.

12. The method of claim 11 comprising the steps of:
   (i) mixing the water-retentive filling material with said water to form a first suspension,
   (ii) adding said urethane prepolymer and said polyol to said first suspension and mixing to form a second suspension,
   (iii) reacting and curing said second suspension to obtain the plant cultivating substrate.

13. The method of claim 11, wherein said polyol is present in an amount of from 0.1 to 300 weight parts relative to 100 weight parts of said water-retentive filling material under dry conditions.

14. The method of claim 11, wherein said polyol contains an ester group.

15. The method of claim 11, wherein said reacting and curing takes place in a substrate forming mold having a top and a bottom.

16. The method of claim 15, wherein said manufacturing is effected such that an upper face of the plant cultivating substrate is located on the bottom of said substrate forming mold.

17. The method of claim 11, wherein said water-retentive filling material comprises: peat moss, coco peat, sawdust, coconut husk, chaff, chaff compost, bark compost, pearlite, vermiculite, or hydrophilic foam resin pulverized powder.

* * * * *

UNITED STATES PATENT AND TRADEMARK OFFICE
CERTIFICATE OF CORRECTION

| | | |
|---|---|---|
| PATENT NO. | : 8,701,344 B2 | Page 1 of 1 |
| APPLICATION NO. | : 10/561622 | |
| DATED | : April 22, 2014 | |
| INVENTOR(S) | : M. Hashimoto et al. | |

It is certified that error appears in the above-identified patent and that said Letters Patent is hereby corrected as shown below:

Title page item (73), change "Suntory Holdings Limitied" to -- Suntory Holdings Limited --

Signed and Sealed this
Twenty-first Day of July, 2015

Michelle K. Lee
*Director of the United States Patent and Trademark Office*

UNITED STATES PATENT AND TRADEMARK OFFICE
CERTIFICATE OF CORRECTION

PATENT NO. : 8,701,344 B2
APPLICATION NO. : 10/561622
DATED : April 22, 2014
INVENTOR(S) : Hashimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1829 days.

Signed and Sealed this

Twenty-ninth Day of September, 2015

Michelle K. Lee
*Director of the United States Patent and Trademark Office*